Aug. 5, 1969

A. F. M. BOUMAN 3,460,141

PULSE RADAR APPARATUSES

Filed April 15, 1968

INVENTOR.
ANTONIUS F.M. BOUMAN
BY

AGENT

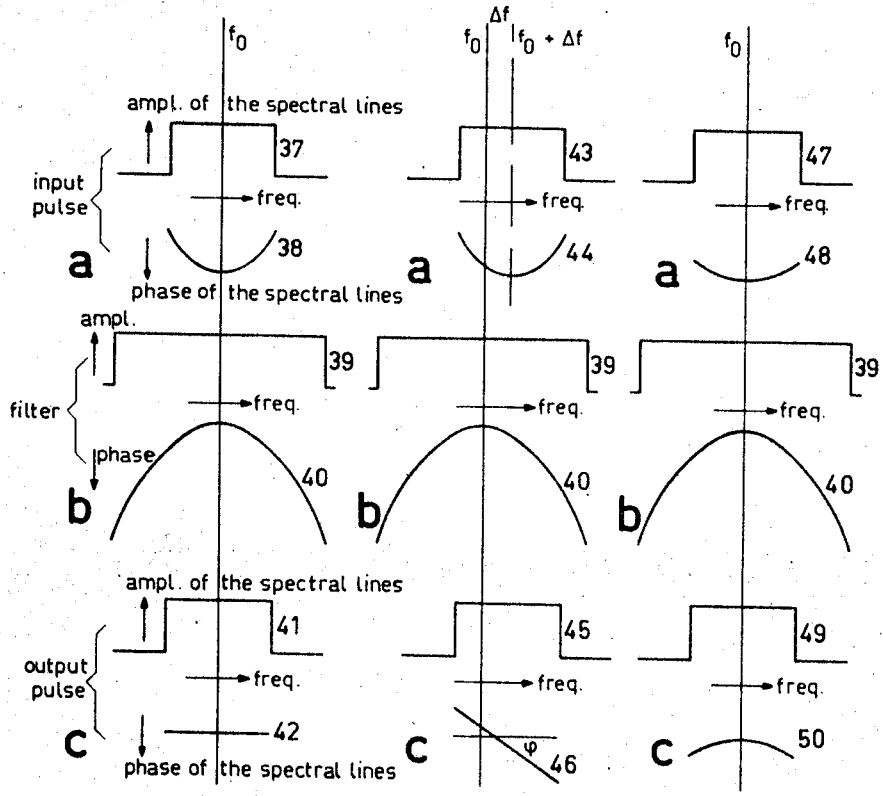

United States Patent Office 3,460,141
Patented Aug. 5, 1969

3,460,141
PULSE RADAR APPARATUSES
Antonius Fredericus Mattias Bouman, Hengelo,
Netherlands, assignor to N.V. Hollandse Signaalapparaten, Hengelo Overijsel, Netherlands,
a firm of the Netherlands
Filed Apr. 15, 1968, Ser. No. 721,345
Int. Cl. G01s 7/28
U.S. Cl. 343—17.2                4 Claims

ABSTRACT OF THE DISCLOSURE

The invention relates to a pulse radar apparatus, the transmitter channel of which includes an arrangement for producing substantially linearly frequency-modulated pulses of comparatively long duration, while its receiver channel includes a pulse compression filter which compresses applied echo pulses having said frequency modulation to output pulses of comparatively short duration. Deviations from $f_0$ and $df_4/dt$ are caused by temperature, voltage and aging changes. A sum and difference amplifier generates error signals proportional to these deviations of the compressed pulse. These signals control members which readjust the above parameters to their nominal value.

---

Figure 1:
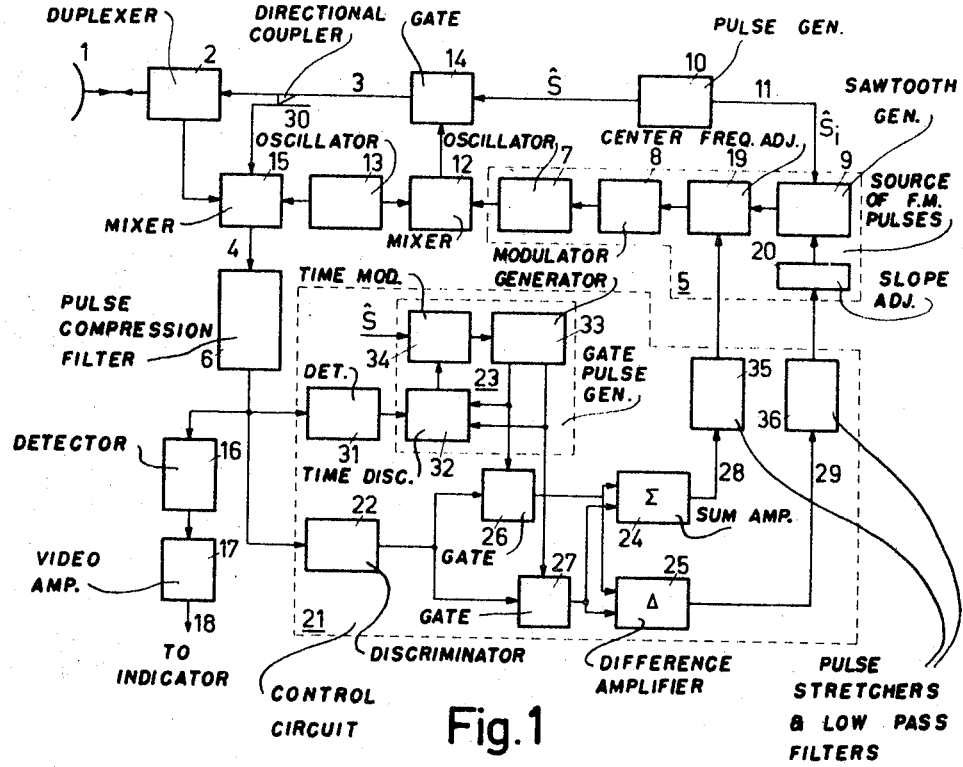

The invention relates to a pulse radar apparatus, the transmitter channel of which includes an arrangement for producing substantially linearly frequency-modulated pulses of comparatively long duration, and the receiver channel of which includes a pulse compression filter which compresses applied echo pulses having said frequency modulation to output pulses of comparatively short duration.

In such a radar apparatus, it is essential that the frequency modulation of the pulses produced by the said arrangement is adapted to the fixed transfer characteristic of the pulse compression filter. However, since the arrangement for producing the frequency-modulated pulses is easily influenced by temperature and voltage variations and by the ageing of components, it is found in practice, that the modulated output pulses of the said arrangement may show a certain deviation $\Delta f$ from the desired centre frequency $f_0$. As the compressed output pulse will then be shifted in time in proportion to the said deviation $\Delta f$, the radar range measurements will no longer be reliable.

In addition to causing the said frequency deviation, the aforesaid influence on the arrangement may affect the modulation in a manner such that the frequency variation in time i.e. the modulation slope $(df/dt)$ is changed, which will cause the compressed pulse to be distorted.

The invention has for its object to provide a radar apparatus of the kind described with such means as required to substantially overcome the aforementioned disadvantages.

According to the invention this object is achieved in that the said arrangement for producing the frequency-modulated output pulses comprises:

Control members adapted to readjust both the center frequency $f_0$ and the desired modulation slope in response to applied error signals, A frequency discriminator the tuning frequency of which corresponds to the desired center frequency $f_0$ and means for feeding pulses derived from the output pulses of the said arrangement and having the same center frequency, through the compression filter to the input of said frequency discriminator, A gate pulse generator producing early and late gate pulses the timing of which is such that the instant of occurrence of the trailing edge of the said early and the leading edge of the said late gate pulse coincide with the instant of occurrence of the maximum of a predetermined compressed pulse applied to the frequency discriminator, A sum and a difference amplifier and two gates which, under the control of said early and the late gate pulses, connect the output of the frequency discriminator to the said sum and difference amplifier respectively, whereby the said sum amplifier produces an output voltage the value and the sign of which correspond to the magnitude and direction of the deviation from the desired center frequency $f_0$, the difference amplifier producing an output voltage the value and the sign of which correspond to the magnitude and direction of the deviation from the desired modulation slope, A first control circuit through which the output voltage of the said sum amplifier is applied as an error signal to the said control member for readjusting the center frequency, and A second control circuit through which the output voltage of said difference amplifier is applied as an error signal to the said control member for readjusting the modulation slope.

The invention and its advantages will be described more fully with reference to the drawings in which:

FIG. 1 shows the block-diagram of a pulse radar apparatus according to the invention, and FIGS. 2, 3, 4 and 5a–5c show a number of diagrams for explaining the operation of the control arrangement as used in the radar apparatus according to the invention.

In the block diagram shown in FIG. 1, reference numeral 1 denotes a radar aerial which is connected through a duplexer 2 to a transmitter channel 3 and a receiver channel 4 of a pulse radar apparatus. With regard to the pulse compression used in this radar apparatus, the transmitter channel includes an arrangement 5 for producing linearly frequency-modulated pulses of comparatively long duration, and the receiver channel includes a pulse compression filter 6 which compresses input pulses having the said frequency modulation to output pulses of comparatively short duration. In the embodiment of FIG. 1 the arrangement 5 comprises an intermediate-frequency oscillator 7 having a variable reactance or modulator 8 and a sawtooth generator 9. The latter is periodically started by a starting pulse $$\hat{S}_1$$

These starting pulses, which appear in the rhythm of the desired pulse recurrence frequency at the output of a synchronizing pulse generator 10, are applied through line 11 to the sawtooth generator 9. The latter has a Miller integrator which is arranged in known manner to produce a linear sawtooth voltage. This output voltage is utilized to control in a known manner the variable reactance or modulator 8, so that in successive time intervals $\tau$ the output signal of the oscillator 7 is continuously varied from a frequency $f_1$ to a frequency $f_2$. Therefore, the arrangement 5 produces a signal linearly varying in frequency and having a given modulation slope and a center frequency $f_0$. This signal is then mixed in a mixer stage 12 with the output signal of a stable local oscillator 13 to obtain the desired transmission frequency level. The output signal of the mixer stage 12 linearly varying in frequency is fed through a gate 14 to the duplexer 2 to be transmitted through aerial 1. The gate 14 is opened by synchronizing pulses $$\hat{S}$$

which, like the starting pulses $$\hat{S}_1$$

are supplied by the synchronizing pulse generator 10 and have the same pulse recurrence frequency as these starting pulses. The time relation between the pulses $$\hat{S}$$

and $$\hat{S}_1$$

is such that the middle of the period in which the gate 14 is opened corresponds to the center of the inclined edge of the sawtooth produced by sawtooth generator 9.

The echo signals received by the aerial 1 are transformed by means of the output signal of the said local oscillator 13 to the original intermediate-frequency in a mixer stage 15. The said pulse compression filter 6 has a dispersive delay circuit and is connected to the output of said mixer stage 15. The compressed pulses appearing at the output of filter 6 are converted by means of a detector 16 into video-pulses which, after amplification by a video-amplifier 17, are applied via line 18, to, for example, an indicator (not shown). If the output pulses of the mixer stage 15 have the ideal frequency modulation, that is to say a modulation slope and a center frequency such that the frequency spectrum of these output pulses is a conjugate complex function of the transfer characteristic of the pulse compression filter 6, these pulses, which originally have a comparatively long duration $\tau$, are compressed in the said filter to short pulses, the duration of which is approximately equal to $2/B$ and the amplitude of which is increased by a factor $\sqrt{B\tau}$, where $B=f_2-f_1$.

According to the invention, a particularly favourable and advantageous radar apparatus is obtained if the arrangement 5 comprises a control member 19 for readjusting the desired center frequency $f_0$ of the frequency-modulated signal, a control member 20 for readjusting the desired modulation slope of this frequency-modulated signal and further control means 21 provided for producing the error signals to be applied to these control members 19 and 20. These control means 21 comprise:

A frequency discriminator 22 the tuning frequency of which corresponds to the desired center frequency $f_0$, means 30 for feeding pulses derived from the output pulses of the said arrangement 5 and having the same center frequency, through the compression filter 6 to the input of said frequency discriminator 22, A gate pulse generator 23 producing early and late gate pulses, the timing of which is such that the instant of occurrence of the trailing edge of the early and the leading edge of the late gate pulse coincide with the instant of occurrence of the maximum of a predetermined compressed pulse applied to the frequency discriminator, A sum and a difference amplifier 24 and 25, and two gates 26 and 27 which, under the control of said early and late gate pulses, connect the output of said frequency discriminator to the said sum and difference amplifier, whereby said sum amplifier produces an output voltage the value and sign of which correspond to the magnitude and direction of the deviation from the desired center frequency $f_0$, and the difference amplifier produces an output voltage the value and sign of which correspond to the magnitude and direction of the deviation from the desired modulation slope, A first control circuit 28 through which the output voltage of the sum amplifier 24 is applied as an error signal to the control member 19, and A second control circuit 29 through which the output voltage of the difference amplifier 25 is applied as an error signal to the control member 20.

In the embodiment shown in FIG. 1, part of the transmission pulse energy is applied through a directional coupler 30 to the mixer stage 15 so that the echo signals received from pulse to pulse are preceded by a test pulse. The test pulse and the echo signals have the same center frequency and the same frequency modulation as the output signal of the arrangement 5. The test pulses as well as the echo signals are applied to the pulse compression filter 6. Therefore the test pulses are subject to the same compression as the echo signals. The compressed pulses are applied to the frequency discriminator 22 and through a detector 31 to a time discriminator 32 which forms part of the said gate pulse generator 23. The latter is of a known construction and apart from said generator 33 comprises a time modulator 34 which is started at the occurrence of a synchronizing pulse $$\hat{S}$$

and then supplies an output pulse after a time interval which is determined by a reference value. In response to such an output pulse, the generator 33 produces the early and late gate pulses; the instant of occurrence of the adjoining edges of these gate pulses must coincide with the maximum of the compressed test pulse appearing at the output of the detector 31. The gate pulses produced are applied to the time discriminator 32 which in the case of a deviation from the aforesaid coincidence supplies a control voltage which readjusts the reference value of the time modulator 34 so that the desired coincidence is restored.

The gate pulses thus produced are utilized to control the gates 26 and 27 which are therefore opened in succession every time the frequency discriminator 22 supplies an output voltage in response to a compressed test pulse applied to it. The value and the sign of this output voltage are directly proportional to any deviation from the center frequency $f_0$ and/or from the modulation slope of the output signal of the arrangement 5, which will be explained below.

First the case is considered in which the output signal of the arrangement 5 has the correct center frequency $f_0$ and the correct modulation slope. The test pulse applied to the pulse compression filter 6 then has a frequency spectrum as illustrated in FIG. 2a. As shown in this figure, this spectrum has a rectangular envelope 37 and a phase characteristic 38 which is parabolic due to the fact that the carrier wave of the test pulse is linearly frequency-modulated. FIG. 2b shows the filter characteristic of the pulse compression filter 6. As is apparent from this figure, the amplitude characteristic 39 of this filter is flat over a frequency range which slightly exceeds the bandwidth of the spectrum of the pulses applied to this filter. The phase characteristic 40 of this filter is the mirror image of the parabolic phase characteristic 38 of the frequency spectrum shown in FIG. 2a. Therefore, looking at the pulse compression filter output similarly i.e. from the viewpoint of frequency, the spectrum of the output signal is as illustrated in FIG. 2c. This spectrum has a rectangular envelope 41 and, as may be derived from the summation of the parabolae 38 and 40, a linear phase characteristic 42. Looking at the same output signal from the viewpoint of time, it consists of a pulse-modulated carrier wave, whereby the shape of the pulses is given by the known $$\frac{\sin e\ x}{x}$$

curve and the carrier frequency is equal to $f_0$ i.e. the center frequency of the output signal.

Figure 5A:
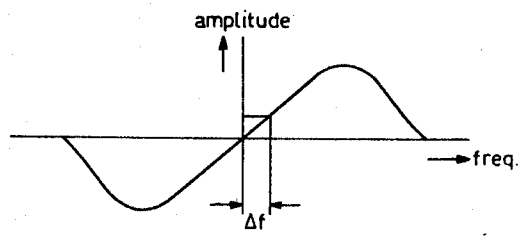

The output voltage of the frequency discriminator is then equal to zero, which is apparent from the discriminator curve shown in FIG. 5a.

FIG. 3a shows the frequency spectrum of the test pulse applied to the pulse compression filter 6 in the case that the output signal of the arrangement 5 shows a frequency deviation $\Delta f$ from the desired center frequency $f_0$, but still has the correct modulation slope. As is apparent from this figure, the spectrum also in this case has a rectangular envelope 43 and a parabolic phase characteristic 44. As may be seen from FIGS. 3a and 3b, this spectrum has been shifted with respect to the filter characteristic of the pulse compression filter in accordance with the deviation $\Delta f$. Looking at the pulse compression filter-output from the view point of frequency, the spectrum (cf. FIG. 3c) has a rectangular envelope 45 and, as may be derived from the summation of the parabolas 44 and 40, a linear phase characteristic 46 which has rotated through an angle $\varphi$ the magnitude of which is proportional to the frequency deviation $\Delta f$. Looking at the same output signal from the viewpoint of time, it consists of a pulse-modulated carrier wave, whereby the shape of the pulses is given by the known $$\frac{\sin e\ x}{x}$$

curve and the carrier frequency is equal to $f_0 + \Delta f$, i.e. the center frequency of the output signal. As shown in FIG. 5a, the frequency discriminator 22 then supplies an output voltage the value and the sign of which are determined by the value and the direction of the deviation $\Delta f$.

During the time this constant output voltage occurs, the two gates 26 and 27 pass equal quantities of energy to the sum amplifier 24, which by summation of said equal quantities produces a pulse the amplitude of which is proportional to the output voltage of the frequency discriminator and hence to the deviation $\Delta f$ from the center frequency $f_0$. By means of a combination 35 of a pulse stretcher and a low-pass filter included in the control circuit 28, the output pulses of the sum amplifier 24 are converted into a direct voltage which is applied as an error signal to the control member 10 so as to ensure that the center frequency of the output signal of the arrangement 5 is readjusted to the required center frequency $f_0$.

The difference amplifier 25, which produces a pulse the amplitude of which is proportional to the difference between the quantities of energy passed by the two gates 26 and 27, does not supply an output pulse, because the quantities of energy passed are equal. The control member 20 therefore is not influenced, which is in agreement with the assumption that the modulation slope of the output signal of the arrangement 5 is correct.

FIG. 4a shows the frequency spectrum of the test pulse applied to the pulse compression filter in the case that the output signal of the arrangement 5 has deviated from the desired modulation slope, but has not deviated from the desired center frequency $f_0$. As is apparent from this figure, the frequency spectrum has a rectangular envelope 47 and a parabolic phase characteristic 48. In dependence upon whether the deviation from the desired modulation slope consists of a greater or a smaller steepness of the slope, this phase characteristic will be more flat or less flat than the phase characteristic 40 of the fixed filter characteristic of the pulse compression filter shown in FIGS. 2b, 3b and 4b. Looking at the pulse compression filter output from the viewpoint of frequency, the spectrum (cf. FIG. 4c) has a rectangular envelope 49 and, as may be derived from the summation of the parabolas 48 and 40, a phase characteristic 50 which is no longer linear, but parabolic. Looking at the same output signal from the viewpoint of time, it consists of a pulse the carrier wave $f_0$ which is frequency-modulated, the value and the direction of the frequency sweep being directly proportional to the magnitude and the direction of the deviation from the desired modulation slope.

Figure 5B:
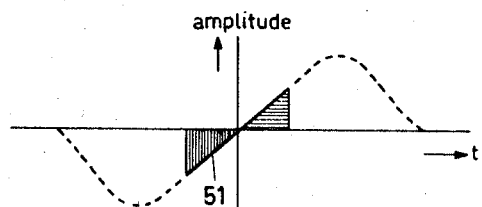

The amplitude of the output voltage of the frequency discriminator 22 then varies in accordance with this frequency sweep from a given negative value to the same positive value, or conversely. In FIG. 5b, this output signal is represented as a function of time by the straight line 51. The equal quantities of energy passed by the gates 26 and 27 are indicated in this figure by the shaded areas. Since the output pulses corresponding to these quantities of energy are of opposite polarity, the difference amplifier 25 supplies a pulse the amplitude of which is a measure for the deviation from the desired modulation slope. By means of a combination 36 of a pulse stretcher and a low-pass filter included in the control circuit 29, the output pulses of the difference amplifier 25 are converted into a direct voltage which is applied as an error signal to the control member 20 so as to thereby correct the modulation slope.

In the case of a small deviation from the desired modulation slope, the output pulse of the pulse compression filter is still compressed substantially to the maximum. However, since the phase characteristic 50 of FIG. 4c will be parabolic even with such a small deviation, the carrier frequency $f_0$ of the compressed test pulse will be frequency modulated. Therefore, even with such small deviations from the desired modulation slope, the control arrangement is effectively counteracting.

The sum amplifier 24, however, in this case produces a signal the mean value of which is zero so that the pulse stretcher of the combination 35 does not supply an output signal, which fact is in agreement with the assumption that the center frequency $f_0$ is correct.

Figure 5C:
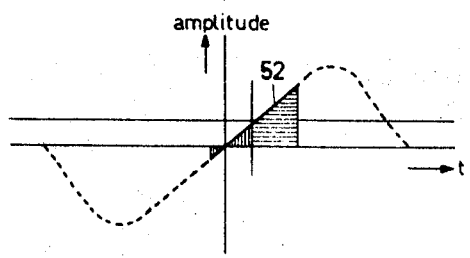

If both the center frequency and the modulation slope are incorrect, the quantities of energy passed by the gates 26 and 27 are no longer equal. The difference amplifier 25 and the sum amplifier 24 will then both supply an output pulse. In FIG. 5c, the output voltage of the frequency discriminator is represented as a function of time by the straight line 52. The quantities of energy passed in this case by the two gates 26 and 27 are indicated by the areas shaded horizontally and vertically, respectively.

In the embodiment, shown in FIG. 1, the control member 19 consists of an amplifier which under the control of the applied error signal readjusts in known manner the zero level of the sawtooth voltage so that the deviation $\Delta f$ is eliminated.

The control member 20 ensures the required correction of the deviation from the desired modulation slope by varying the steepness of the sawtooth voltage produced.

Summarizing, it may be said that the radar apparatus according to the invention is distinguished by two control circuits which are not only of simple construction, but also have the great advantage that despite the common use of a single frequency discriminator for both control circuits, these control circuits do not influence each other at all.

It will be appreciated that various modifications of the embodiment described are possible without leaving the general principle of the invention. For example, it is also possible to use instead of the special test pulse a selected received echo pulse. Moreover, it will be clear that the arrangement 5 for producing the frequency-modulated pulses may be replaced by any known type of sweep oscillator.

I claim:

1. In a pulse radar apparatus having a transmitter channel which includes an arrangement for producing substantially linearly frequency-modulated pulses of comparatively long duration, and a receiver channel which includes a pulse compression filter for compressing applied echo pulses having said frequency modulation to output pulses of comparatively short duration; the improvement wherein the said arrangement for producing the frequency-modulated output pulses comprises:

first and second control members connected to readjust the center frequency $f_0$ and the desired modulation slope respectively in response to applied error signals.

a frequency discriminator having a tuning frequency which corresponds to the desired center frequency $f_0$ and means for feeding pulses derived from the output pulses of the said arrangement and having the same center frequency, through the compression filter to the input of said frequency discriminator, a gate pulse generator means for producing early and late gate pulses the timing of which is such that the instant of occurence of the trailing edge of the said early and the leading edge of the said late gate pulse coincide with the instant of occurrence of the maximum of a predetermined compressed pulse applied to the frequency discriminator.

a sum and a difference amplifier and two gates which, under the control of said early and the late gate pulses, connect the output of the frequency discriminator to the said sum and difference amplifier respectively, whereby the said sum amplifier produces an output voltage the value and the sign of which correspond to the magnitude and direction of the deviation from the desired center frequency $f_0$, and the difference amplifier produces an output voltage the value and the sign of which correspond to the magnitude and direction of the deviation from the desired modulation slope, a first control circuit through which the output voltage of the said sum amplifier is applied as an error signal to the first control member for readjusting the center frequency, and a second control circuit through which the output voltage of said difference amplifier is applied as an error signal of the second control member for readjusting the modulation slope.

2. A radar apparatus as claimed in claim 1, wherein the said predetermined compressed pulse applied to the frequency discriminator consists of a test pulse which is obtained by supplying part of the transmission pulse energy to the receiver channel.

3. A radar apparatus as claimed in claim 1 further comprising a detector wherein the test pulse is applied through said detector to the said gate pulse generator circuit.

4. A radar apparatus as claimed in claim 3, wherein the gate pulse generator circuit comprises a gate pulse generator having a control circuit which includes a time modulator and a time discriminator, to which time discriminator are applied on the one hand the gate pulses produced and on the other hand the test pulse, the said circuit supplying an output signal which controls the time modulator so that the gates controlled by the gate pulses produced are opened in order of succession at the instant at which the frequency discriminator supplies an output signal in response to the applied test pulse.

References Cited
UNITED STATES PATENTS

| | | | |
|---|---|---|---|
| 3,105,967 | 10/1963 | Cook et al. | 343—17.2 |
| 3,176,296 | 3/1965 | Adams | 343—17.2 |

RICHARD A. FARLEY, Primary Examiner

MALCOLM F. HUBLER, Assistant Examiner